United States Patent
Ziefle

(10) Patent No.: US 10,024,374 B2
(45) Date of Patent: Jul. 17, 2018

(54) METHOD FOR DETERMINING A CHARACTERISTIC CURVE OF A CLUTCH OF A CLUTCH ACTIVATION SYSTEM IN A DRIVETRAIN, IN PARTICULAR OF A MOTOR VEHICLE

(71) Applicant: Schaeffler Technologies AG & Co. KG, Herzogenaurach (DE)

(72) Inventor: Florian Ziefle, Freudenstadt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 93 days.

(21) Appl. No.: 15/038,845

(22) PCT Filed: Jan. 29, 2015

(86) PCT No.: PCT/DE2015/200044
§ 371 (c)(1),
(2) Date: May 24, 2016

(87) PCT Pub. No.: WO2015/120850
PCT Pub. Date: Aug. 20, 2015

(65) Prior Publication Data
US 2016/0377131 A1 Dec. 29, 2016

(30) Foreign Application Priority Data
Feb. 14, 2014 (DE) .......... 10 2014 202 757

(51) Int. Cl.
*F16D 48/08* (2006.01)
*F16D 48/06* (2006.01)
(Continued)

(52) U.S. Cl.
CPC .......... *F16D 48/08* (2013.01); *B60K 6/387* (2013.01); *B60W 20/40* (2013.01);
(Continued)

(58) Field of Classification Search
CPC ...... F16H 61/688; F16D 48/08; F16D 48/064; B60K 6/387; B60K 6/46; B60W 20/40
(Continued)

(56) References Cited

U.S. PATENT DOCUMENTS 5,737,979 A * 4/1998 McKenzie ............ F16H 61/061
74/731.1
6,213,911 B1 * 4/2001 Salecker ............... B60W 10/02
477/174
(Continued)

FOREIGN PATENT DOCUMENTS

DE 102007015679 10/2008
DE 102008030473 1/2009
(Continued)

*Primary Examiner* — Gertrude Arthur Jeanglaude
(74) *Attorney, Agent, or Firm* — Volpe and Koenig, P.C.

(57) ABSTRACT

The invention relates to a method for determining a characteristic curve of a clutch of a clutch activation system in a drivetrain, in particular of a motor vehicle, in which the clutch is activated by an actuator, wherein a bite point of the clutch is adapted as a first support point of the characteristic curve. In a method in which the accuracy of the specific clutch characteristic curve is improved, a preload point of the actuator, preferably of an electric central disengagement device, is used as a second support point of the characteristic curve.

12 Claims, 6 Drawing Sheets

(51) Int. Cl.
*B60K 6/387* (2007.10)
*B60W 20/40* (2016.01)
*B60K 6/46* (2007.10)

(52) U.S. Cl.
CPC .............. *F16D 48/064* (2013.01); *B60K 6/46* (2013.01); *B60Y 2200/92* (2013.01); *B60Y 2300/427* (2013.01); *B60Y 2400/42* (2013.01); *F16D 2500/1045* (2013.01); *F16D 2500/1066* (2013.01); *F16D 2500/10412* (2013.01); *F16D 2500/3026* (2013.01); *F16D 2500/30404* (2013.01); *F16D 2500/50236* (2013.01); *F16D 2500/50245* (2013.01); *F16D 2500/50251* (2013.01); *F16D 2500/50275* (2013.01); *F16D 2500/70264* (2013.01); *F16D 2500/70605* (2013.01); *Y10S 903/914* (2013.01); *Y10S 903/946* (2013.01)

(58) Field of Classification Search
USPC .................. 701/22, 36; 477/97; 73/865.9
See application file for complete search history.

(56) References Cited

U.S. PATENT DOCUMENTS

| | | | |
|---|---|---|---|
| 8,392,083 | B2 | 3/2013 | Hodrus et al. |
| 9,416,874 | B2* | 8/2016 | Vu .................. F16H 61/688 |
| 9,605,719 | B2* | 3/2017 | No .................. F16D 48/06 |
| 2010/0113218 | A1 | 5/2010 | Herter et al. |
| 2015/0369364 | A1* | 12/2015 | Vu .................. F16H 61/688 |
| | | | 701/53 |

FOREIGN PATENT DOCUMENTS

| | | |
|---|---|---|
| DE | 102010024941 | 1/2011 |
| DE | 102012204940 | 10/2012 |
| DE | 102013205109 | 10/2013 |
| EP | 1437520 | 7/2004 |
| EP | 1491787 | 12/2004 |
| EP | 2014946 | 1/2009 |

\* cited by examiner

METHOD FOR DETERMINING A CHARACTERISTIC CURVE OF A CLUTCH OF A CLUTCH ACTIVATION SYSTEM IN A DRIVETRAIN, IN PARTICULAR OF A MOTOR VEHICLE

BACKGROUND

The invention is directed to a method for determining a characteristic curve of a clutch of a clutch activation system in a drivetrain, in particular of a motor vehicle, in which the clutch is activated by an actuator, wherein a bite point of the clutch is adapted as a first reference point of the characteristic curve.

DE 10 2010 024 942 A1 discloses a method for controlling a dual clutch transmission with at least two sub drivetrains, of which each can be coupled to an internal combustion engine by means of a clutch. While the motor vehicle comprising the dual clutch transmission is in drive mode, a bite point of the clutch is determined independently of the engine torque. The bite point constitutes a support point of the clutch characteristic curve for this.

With a motor vehicle with a hybrid drivetrain, the drive resistance can be overcome by two independent energy sources, in most cases the fuel of an internal combustion engine and electrical energy from a traction battery of an electric motor, by conversion into mechanical energy. According to DE 10 2008 030 473 A1, a vehicle with P2 hybrid topology is known, in which the electric motor is disposed at a second point in series with the internal combustion engine. Between the two components a separating clutch that is disposed immediately after the internal combustion engine can enable a purely electric drive in the disengaged state or can pass torque from the internal combustion engine to the drive wheel in the engaged state.

A further function of the separating clutch consists of starting the internal combustion engine. For this purpose, energy is transferred to the static internal combustion engine by a targeted increase of the torque of the electric motor and engaging the separating clutch, and said engine is thus accelerated. Regarding the ride comfort, the torque transferred by the separating clutch must be precisely known during this in order to avoid unintended acceleration of the vehicle, because the torque of the electric motor is also transferred to the drive wheels at the same time.

The torque transferred by the separating clutch is directly dependent on the position of the clutch activating actuator. For estimating the transferred clutch torque, on the one hand the position of the actuator relative to the possible travel must be known, on the other hand the clutch characteristic curve (clutch torque as a function of the actuator position) must be referenced to the actuator travel.

A stop on the left or right end of the disengagement travel is approached for referencing the position of the actuator that activates the separating clutch. This referencing is mainly carried out following a long period with the vehicle at a standstill in order to check the position of the actuator on the travel path.

The clutch characteristic curve is not constant due to different influencing factors such as wear, readjustment of the clutch, temperature and ageing processes. The bite point is referenced for ensuring the accuracy of the clutch torque during a restart of the internal combustion engine. In order to accurately determine the characteristic curve on the actuator axis, with the internal combustion engine at a standstill, a bite point is adapted by slowly engaging the separating clutch and analyzing the influence of the engaging clutch on the electric motor, which is rotated at a predetermined revolution rate. In doing so, due to a predetermined target clutch torque only a negligible torque is transferred by means of the separating clutch. The bite point is determined by analyzing a signal response from the electric motor that can be associated with the target clutch torque.

Furthermore, the position of the preload point is required in order to impose a constant axial preload on the release bearing during the hybrid mode. A method for operating an activating device of a clutch with a stator device, a rotor device that can be rotated relative to the stator device and a carriage device with a release element that can be displaced relative to the rotor device in the axial direction to a limited extent, which can be brought into contact with a disk spring of the clutch, is known from DE 10 2013 205 109 A1. For this a preload point is determined such that the release bearing of the carriage device exerts a minimal pressing force on the disk spring of the clutch during rotation of the clutch, wherein the stator device is energized to displace the carriage device such that the preload point is not exceeded during rotation of the clutch. For determining the preload point, the stator device is energized such that the carriage device is displaced in the axial direction into a region in which the preload point is assumed to lie, and the current drain of the stator device and/or the revolution rate of the rotor device and/or the speed of the carriage device in said region are monitored.

The adaptation of the bite point of the clutch and the preload point of the actuator to the clutch can only be carried out independently of each other and only in certain cases.

SUMMARY

The object of the invention is thus to provide a method for determining a characteristic curve of a clutch with which an accurate estimate of the clutch characteristic curve is possible.

According to the invention, the object of the invention is achieved by using a preload point of the actuator, preferably of an electric central disengagement device, as a second support point of the characteristic curve. The inclusion of the preload point in determining the characteristic curve of the clutch enables stiffnesses in the mechanical structure of the clutch as well as of the central disengagement device to be taken into account, whereby a significantly more accurate determination of the clutch characteristic curve is possible. This results in a finding with no time limit and increased accuracy for the estimation of the clutch characteristic curve. Due to the use of the electric central disengagement device, the clutch can be subjected to both tension and compression.

Advantageously, a preload point is calculated as a second support point of the characteristic curve based on the adapted bite point or the preload point is adapted before the activation of the drivetrain and the bite point is calculated based on the adapted preload point. This has the advantage that only one adaptation process is necessary for determining the bite point or the preload point for determining the characteristic curve of the clutch. This results in a reduction of the application cost. Nevertheless, the exact position of the preload point and the bite point over the disengagement travel of the actuator are known, which is utilized for the assessment of the position of the characteristic curve of the clutch. The choice of whether adaptation of the bite point or of the load point should be carried out can be decided using the quality and the drive state of the motor vehicle. Accurate knowledge of the position the two characteristic points on the clutch characteristic curve is thus obtained at reduced cost by the use of the relationships.

Advantageously, a check is made as to whether there is a working point shift of the characteristic curve of the clutch, and the bite point and/or the preload point are calculated depending on the working point shift of the characteristic curve of the clutch. Due to the working point shift, the force of the disk spring of the clutch changes, which results in a change of all the forces, and sometimes even stiffnesses of the separating clutch, and hence of the clutch characteristic curve.

In one embodiment, with an unchanged working point a constant is added to the adapted bite point or the adapted preload point, from which the calculated preload point or the calculated bite point results. This is possible because all mechanical parameters of the clutch influencing the clutch characteristic curve can be considered to be constant.

In one embodiment, the calculation of the preload point or of the bite point is carried out depending on a clutch gear ratio and/or a pressing force on the clutch at the preload point and the bite point and/or a cover elasticity of a clutch cover at the preload point and the bite point and/or an adjustment ring force at the preload point and the bite point. These criteria are derived from the mechanical parameters that are considered to be constant.

In one version, on detection of a working point shift a rate of wear of the clutch is determined, which is integrated to a distance from the bite point and the preload point, whereby a rate of wear dependent parameter is obtained and the bite point is calculated from the bite point without a working point shift using the rate of wear dependent parameter and/or the preload point is calculated from the preload point without a working point shift using the rate of wear dependent parameter. Due to the working point shift, the force of the disk spring changes, which results in a change of all forces and sometimes even stiffnesses. The characteristic curve of the lining elasticity of the clutch and the characteristic curve of the adjustment ring elasticity of the central disengagement device comprise a marked nonlinearity and must be linearized in the relevant regions for the computer model.

In one development, the working point shift occurs as lining wear of the dry clutch and/or as a result of temperature differences in the clutch. By integration of an energy model, the lining wear of the friction lining of the clutch can be estimated and used as an input variable for a computer model for determining the load point or the preload point. The quantification of a temperature-related working point shift can be carried out with a temperature sensor.

Advantageously, a calculation of the working point shift is carried out by a differential treatment of two successive adaptations of the bite point or/or of the preload point. In doing so, the wear of the friction lining of the separating clutch underlying the working point shift can be specifically estimated.

In one embodiment, a wear adjustment of the clutch can be detected from the working point shift. Such a wear adjustment comprises a readjustment of the disk spring to maintain the working point and hence the pressing forces. The working point is held within a range due to the defined discrete step width of the readjustment device. However, it can also be concluded from the working point shift whether new clutch linings are necessary.

In a further embodiment, with knowledge of the current preload point and of the current bite point a re-parameterization of the characteristic curve of the clutch is carried out. Because said points are also used as support points of the clutch, the adaptation of the characteristic curve of the clutch can be particularly simply carried out with the knowledge of the preload point and the bite point.

In order to improve the accuracy of the adaptation of the characteristic curve of the clutch, a stop of the actuator at one end of a clutch travel is determined as a third support point of the characteristic curve of the clutch for referencing a position of the actuator.

In a preferred version, the clutch in the form of a separating clutch is used in a hybrid drivetrain, wherein the separating clutch is disposed between an internal combustion engine and an electric motor, and with the separating clutch engaged a transfer of torque is carried out from the electric motor to the non-running internal combustion engine in order to start the internal combustion engine. When starting the internal combustion engine, greater starting comfort is thus provided, because greater accuracy of the clutch torque, which results from the characteristic curve of the separating clutch, is provided.

BRIEF DESCRIPTION OF THE DRAWINGS

The invention allows numerous embodiments. One of these will be described in detail using the figures represented in the illustrations.

In the figures.

Identical features are denoted with the same reference characters.

DETAILED DESCRIPTION OF THE PREFERRED EMBODIMENTS

Figure 1:
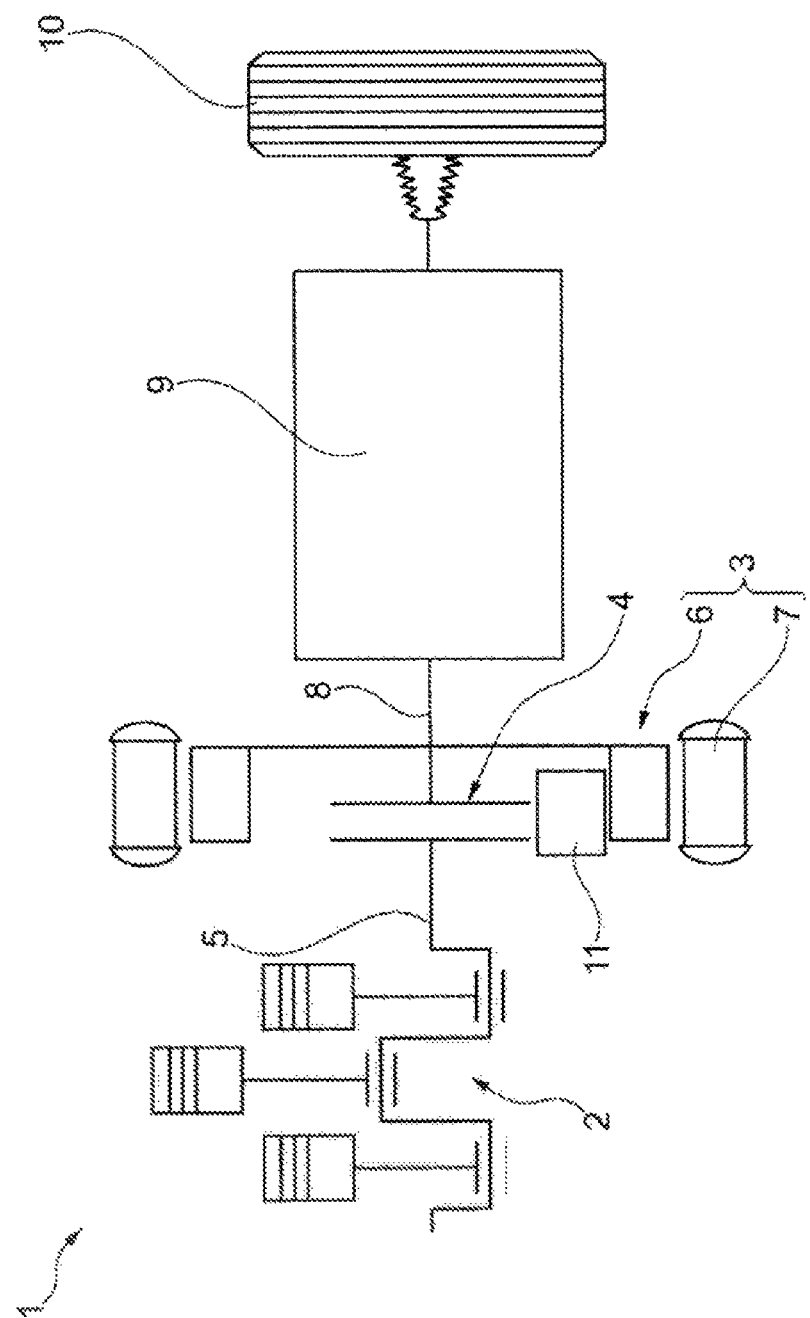
FIG. 1: shows a basic illustration of a hybrid drive.

In FIG. 1 a basic illustration of a drivetrain 1 of a hybrid vehicle is represented. This drivetrain 1 comprises an internal combustion engine 2 and an electric motor 3. A separating clutch 4 is disposed between the internal combustion engine 2 and the electric motor 3 immediately after the internal combustion engine 2. The internal combustion engine 2 and the separating clutch 4 are connected to each other by means of a crankshaft 5. The electric motor 3 comprises a rotatable rotor 6 and a fixed stator 7. The output shaft 8 of the separating clutch 4 is connected to a gearbox 9 that contains a coupling element that is not illustrated further, for example a second clutch or a torque converter that is disposed between the electric motor 3 and the gearbox 9. The gearbox 9 transfers the torque produced by the internal combustion engine 2 and/or the electric motor 3 to the drive wheels 10 of the hybrid vehicle.

Figure 2:
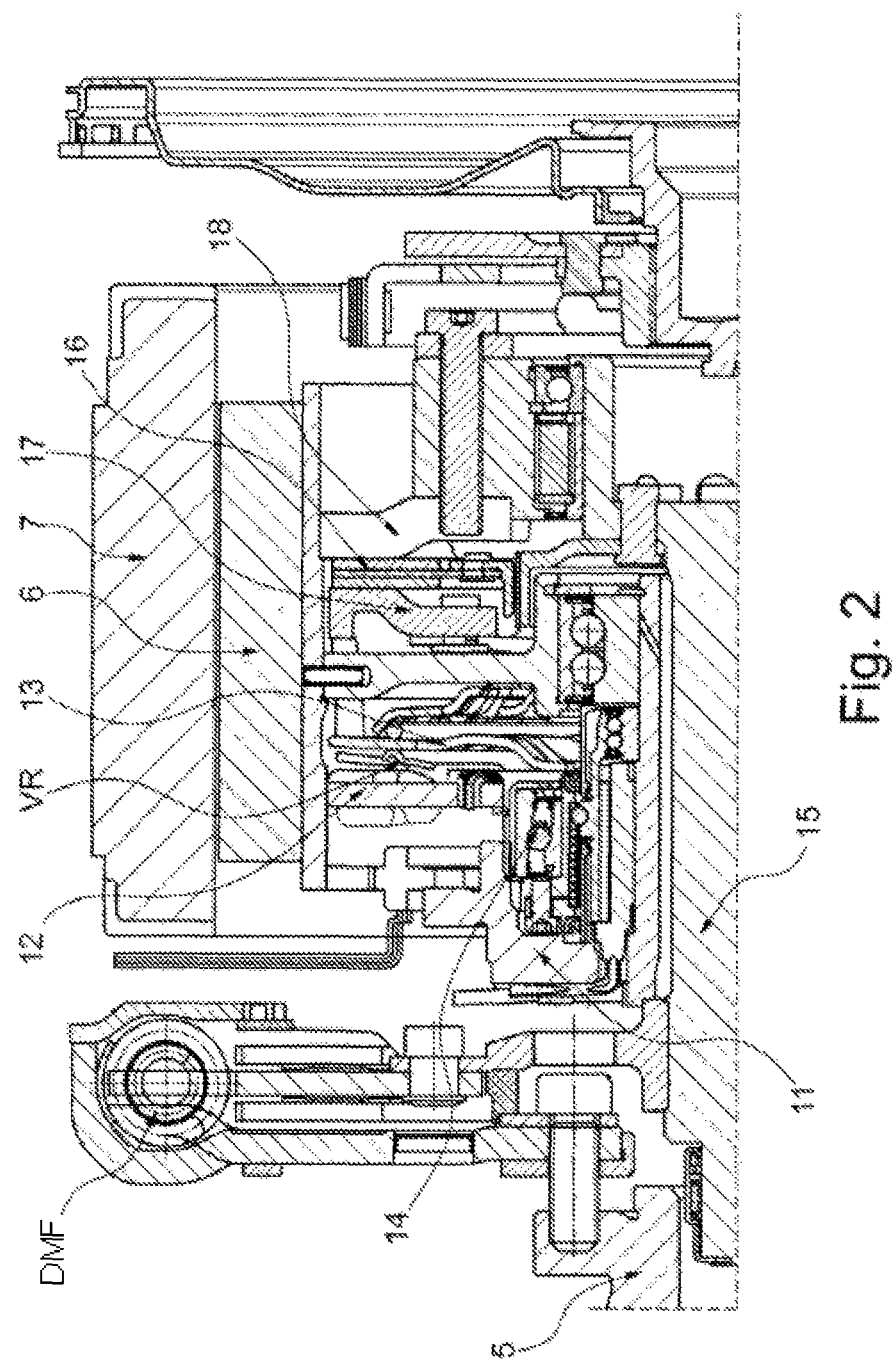
FIG. 2: shows a representation of a clutch with an electric central disengagement device.

The separating clutch 4 that is disposed between the internal combustion engine 2 and the electric motor 3 is engaged in order to start the internal combustion engine 2 while the hybrid vehicle is travelling with the torque produced by the electric motor 3 or to travel during a boost mode with a driving internal combustion engine 2 and electric motor 3. The separating clutch 4 is activated for this by an actuator in the form of an electric central disengagement device 11. The electric central disengagement device 11 is disposed coaxially around a flange shaft 15 that is connected to the crankshaft 5 of the internal combustion engine 2 by means of a dual mass flywheel DMF (FIG. 2).

In order to ensure that during the restarting of the internal combustion engine 2 by the electric motor 3 sufficient torque is provided by electric motor 3, which is both moving the motor vehicle by means of the drive wheels 10 without a loss of comfort and at the same time is also actually starting the internal combustion engine 2, an accurate knowledge of a clutch characteristic curve of the separating clutch 4 is necessary. This clutch characteristic curve is adapted from at least three support points: the bite point TP, the preload point VLP and a stop of the electric central disengagement device 11 that activates the separating clutch 4.

In this case the preload point VLP represents the position at which the actuator 11 just starts to disengage the separating clutch 4 when the clutch is engaged. The actuator 11 presses with a defined preload against the tongues of a disk spring 13 of the separating clutch 4 that is not illustrated further and thus results in a reduction of the pressing force of the disk spring 13 on a clutch disk.

The main reason for the preload point adaptation is to ensure a defined bearing load of a release bearing 14 of the electric central disengagement device 11 during the hybrid driving mode with the separating clutch 4 engaged. Due to the axial preload, a defined pressing angle is maintained in the release bearing 14, which ensures the rolling motion of the balls between the inner ring and the outer ring of the release bearing 14. Moreover, a non-positive connection between the outer ring of the release bearing 14 and the tongues of the disk spring 13 is guaranteed and hence wear caused by unwanted relative movement between the two components is prevented.

During the hybrid driving mode, the preload point VLP constitutes the lower limit of the actuator travel $S_{Rel}$, and the travel should not fall below said limit in order to meet the aforementioned criteria.

On the other hand, the bite point TP represents the state of the separating clutch 4 in which a torque is just transferred due to contact of the pressure plate 17 and the counter plate 18 with the clutch disk 16. This characteristic point is used directly for the positioning of the electric central disengagement device 11 during starting of the internal combustion engine 2. During starting of the internal combustion engine 2, a larger clutch torque is required with high accuracy. Only the accurate knowledge of the bite point TP ensures that the electric central disengagement device 11 moves to the correct position in the characteristic curve. If the position of the bite point TP changes, for example due to wear on the clutch linings, then the clutch characteristic curve stored in the clutch controller must be adapted to the newly determined position in order for the envisaged torque to continue to be transferred during an internal combustion engine start.

A further function of the bite point TP is to ensure a fully disengaged separating clutch 4 during electric travel.

Figure 3:
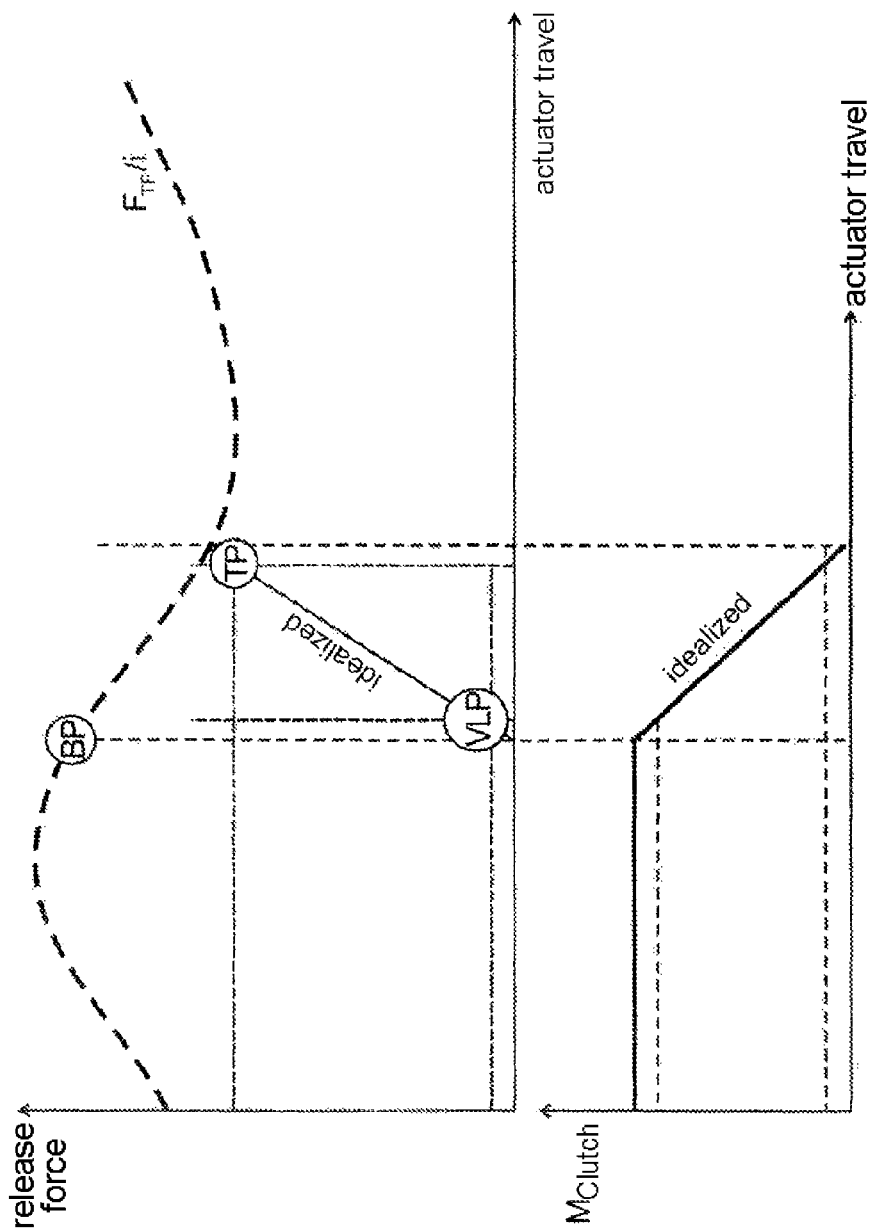
FIG. 3: shows an idealized representation of a release force of an actuator and a clutch characteristic curve against the disengagement travel of the actuator.

The upper image in FIG. 3 shows an idealized profile of the release force $F_{Rel}$ against the position $S_{Rel}$ of the electric central disengagement device 11. The release force $F_{Rel}$ necessary for activation of the separating clutch 4 is essentially determined by the force of the disk spring 13 and the gear ratio i of the separating clutch 4.

In the upper diagram, the disk spring force (release force $F_{Rel}$) normalized to the clutch gear ratio i is shown against the actuator travel. In the normal case with a compressed separating clutch 4 ("normally closed") with an adjusting unit, the working point BP is located to the right of the force maximum of the disk spring force (release force $F_{Rel}$). If no force is exerted against the tongues of the disk spring 13 by the actuator in the form of an electric central disengagement device 11, then the separating clutch 4 is fully engaged and maximum torque can be transferred.

For activation of the engaged separating clutch 4, the central disengagement device 11 must be moved to the right, starting from the origin of the coordinate system, until the tongues of the disk spring 13 are contacted at the working point BP of the separating clutch 4. When using an axial preload, the preload point VLP of the clutch 4 is reached. An increase of the release force $F_{Rel}$ results in further activation of the disk spring 13 until finally the disk spring force normalized to the clutch gear ratio i is overcome and the pressure plate 17 releases the clutch disk 16. At this point, no torque can be transferred by the separating clutch 4. The bite point TP is reached somewhat sooner with a just detectable clutch torque $M_{Clutch}$.

The lower image shows the torque characteristic curve of the separating clutch 4 against the actuator travel $S_{Rel}$. To the left of the preload point VLP, the separating clutch 4 is engaged and can transfer the maximum torque $M_{Clutch}$. By operating the disk spring tongues, the torque transfer capability of the separating clutch 4 is steadily reduced until a minimal torque $M_{Clutch}$ can be transferred at the bite point TP. A further activation results in full disengagement of the separating clutch 4.

In the following, a computer model will be considered that describes a mathematical relationship between the preload point VLP and the bite point TP: This consideration includes the following points 1. Analytical derivation of the separation between the preload point VLP and the bite point TP on the actuator axis $S_{Rel}$ as characteristic points of the characteristic curve of the separating clutch 4
2. Variation of the two characteristic points following a shift of the working point BP.
3. Utilizing the Information from the relationship of the two points.

Analytical derivation of the separation between the preload point VLP and the bite point TP For the derivation of the relationship between the preload point VLP and the bite point TP, some assumptions are made at the start.

Figure 4:
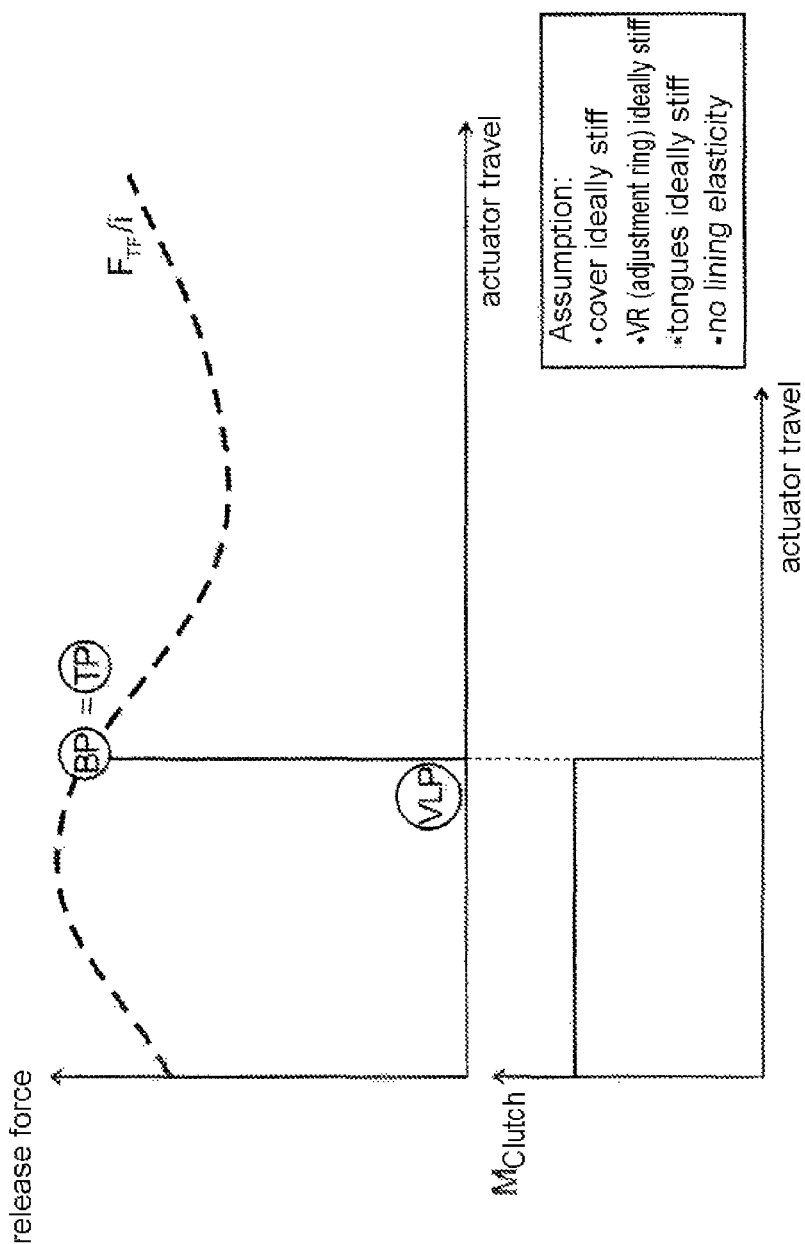
FIG. 4: shows an idealized representation of the release force of the actuator and the clutch characteristic curve for the calculation of a bite point and of a preload point of the clutch, for which all the components of the clutch are assumed to be ideally stiff (stiffness→∞)

In the initial stage, an idealized separating clutch is to be considered. The following ideal assumptions are assigned to the separating clutch:

lining elasticity BF in the clutch disk 16 and the clutch disk is ideally stiff: $C_{BF}=\infty$ clutch or clutch cover 12 ideally stiff: $C_{Cover}=\infty$ adjustment ring VR of the SAC adjusting unit ideally stiff: $C_{VR}=\infty$ tongues of the disk spring 13 ideally stiff: $C_{Tongues}=\infty$ FIG. 4 shows the profile of the release force $F_{Rel}$ and of the clutch torque $M_{Clutch}$ of said idealized separating clutch against the actuator travel $S_{Rel}$. For the activation of the engaged separating clutch 4, the pressing force of the separating clutch 4 that is transferred to the tongues with i must be rapidly overcome by the central disengagement device 11. Due to the assumption of ideal stiffness of all components, the central disengagement device 11 does not have to overcome any travel produced by components' flexibility and activates the separating clutch 4 directly at the working point BP.

The torque characteristic curve $M_{Clutch}$ of the separating clutch 4 is formed of a step function in this case. To the left of the working point BP, the central disengagement device 11 is at a distance from the tongues of the disk spring 13 and can therefore not exert force on the separating clutch 4. The separating clutch 4 can transfer the maxim torque $M_{Clutch}$. Because the central disengagement device 11 can apply the necessary release force $F_{Rel}$ for the activation of the separating clutch 4 with the exclusion of elastic deformation caused by flexibility, the clutch torque $M_{Clutch}$ decreases rapidly at the working point BP. To the right of the working point BP, the separating clutch 4 is disengaged and cannot transfer any torque $M_{Clutch}$.

Due to the assumption of the ideal stiffnesses, a direct effect on the preload point VLP and the bite point TP is to be recognized. Both points TP, VLP now lie at the same position on the actuator axis $S_{Rel}$ and there is no separation between them.

This means that the separation of the bite point TP and the preload point VLP is primarily determined by the stiffnesses of all clutch components.

The clutch model is expanded below by the integration of component stiffnesses. For the determining of the separation between the preload point VLP and the bite point TP, only the effect of the infinite stiffnesses of the components on the actuator travel $S_{Rel}$ has to be taken into account.

Influence of tongue stiffness on the actuator travel $S_{Rel}$:

Due to the axially acting release force $F_{Rel}$, the tongue stiffness results in an elastic deformation (bending) of the disk spring tongues, which results in an increase in the actuator travel $S_{Rel}$ of the central disengagement device. The following linear relationship results:

$$s_{Actuator,Tongue} = s_{Tongue} = c_{Tongue} \cdot F_{Rel}$$

With a known constant tongue stiffness and knowledge of the maximum release force $F_{Rel}$, which acts directly axially on the tongues, the elastic deformation of the tongues, which extends the actuator travel $S_{Rel}$, can be calculated with said relationship.

Influence of lining elasticity on the actuator travel $S_{Rel}$:

The elasticity of a friction lining of the separating clutch 4 is dependent on the pressing force of the separating clutch 4 and also affects the actuator travel $S_{Rel}$. As a result of the lever action of the tongues of the disk spring 13, the compliance arising from the lining elasticity BF is transmitted to the central disengagement device 11 with the clutch gear ratio i:

$$s_{Actuator,BF} = i \cdot s_{Lining} \cap s_{Lining} = f(c_{Lining}, F_{Lining})$$

The spring rate of the clutch lining is not constant, in contrast to the tongue stiffness. For the calculation of the disengagement travel $S_{Rel}$ resulting from the lining elasticity BF, the pressing forces at the preload point VLP and at the bite point TP must be known.

Influence of the cover elasticity and adjustment ring elasticity on the actuator travel $S_{Rel}$:

The influence of the stiffness of the adjustment ring VR and the cover 12 is transmitted as follows to the central disengagement device 11. The factor (i+1) results from a coupled rotational and translational displacement of the disk spring 13 with elastic deformation of the bearing point cover 12.

$$s_{Actuator,Cover} = (i+1) \cdot s_{Cover} = (i+1) \cdot c_{Cover} \cdot F_{Cover}$$

$$s_{Actuator,VR} = (i+1) \cdot s_{VR} \cap s_{VR} = f(c_{VR}, F_{VR})$$

The elastic deformation of the cover 12 is caused by a constant stiffness. The spring rate of the adjustment ring VR comprises in turn a nonlinear profile and must be analyzed individually at both points.

Influence of all stiffnesses on the actuator travel $S_{Rel}$:

The sum of the flexibilities of all components finally gives the travel difference that must be overcome by the central disengagement device 11 for the activation of the separating clutch 4:

$$s_{Total} = s_{Actuator,Tongue} + s_{Actuator,Lining} + s_{Actuator,Cover} + s_{Actuator,VR}$$

$$s_{Total} = s_{Tongue} + s_{Lining} \cdot i + (s_{Cover} + s_{VR}) \cdot (i+1)$$

The distance between the preload point VLP and the bite point TP results from the total travel by subtraction of the two conditions:

travel from clutch engaged to the preload point VLP→$s_{VLP}$ travel from the bite point TP to clutch 4 disengaged→$s_{TP}$ $$s_{VLP,TP} = s_{Total} - s_{VLP} - s_{TP}$$

$$s_{VLP,TP} = s_{Tongue} + s_{Lining} \cdot i + (s_{Cover} + s_{VR}) \cdot (i+1) - s_{VLP} - s_{TP}$$

Figure 5:
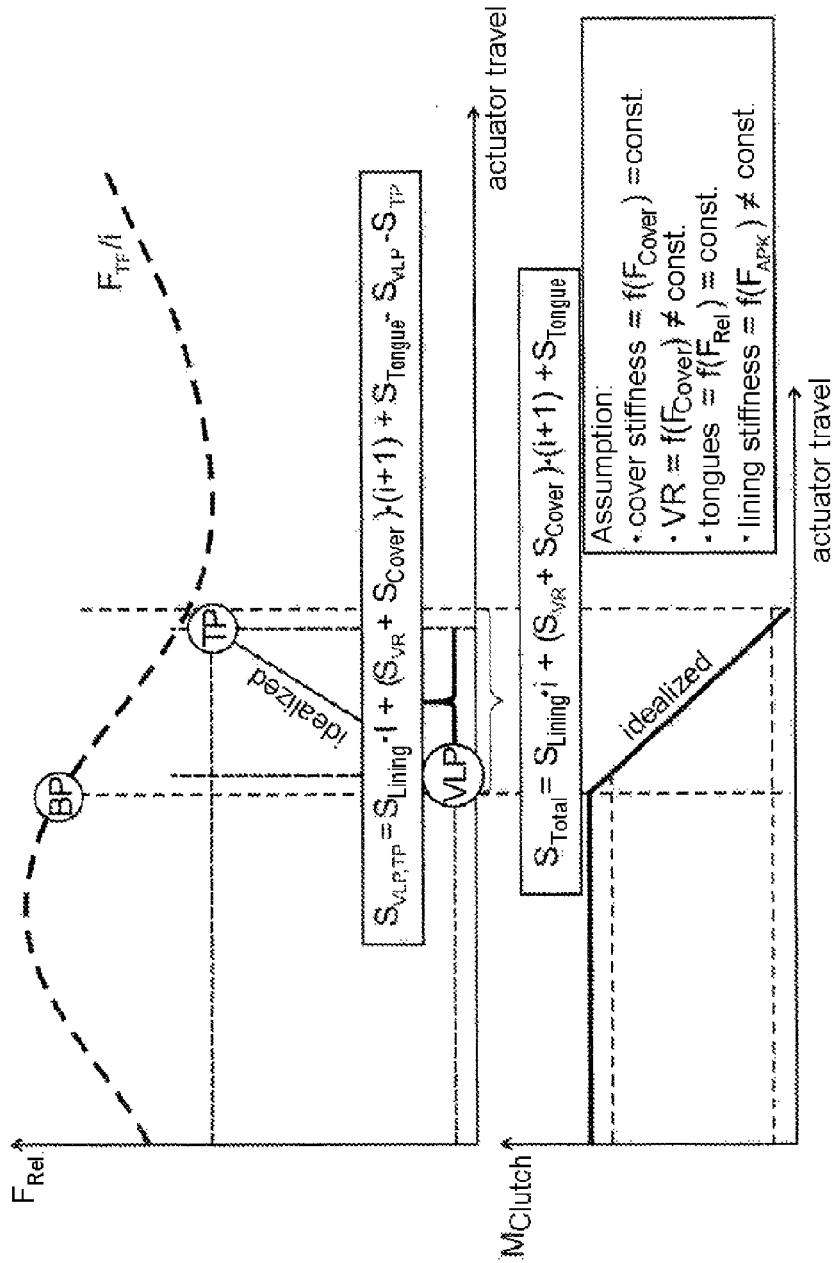
FIG. 5: shows an idealized representation of the release force of the actuator and the clutch characteristic curve for the calculation of a bite point and of a preload point of the clutch while taking into account the stiffness of the clutch.

With the equation given above, knowing either the bite point TP or the preload point VLP and knowing the stiffnesses as well as the forces, it is now possible to conclude the other point (FIG. 5).

Figure 6:
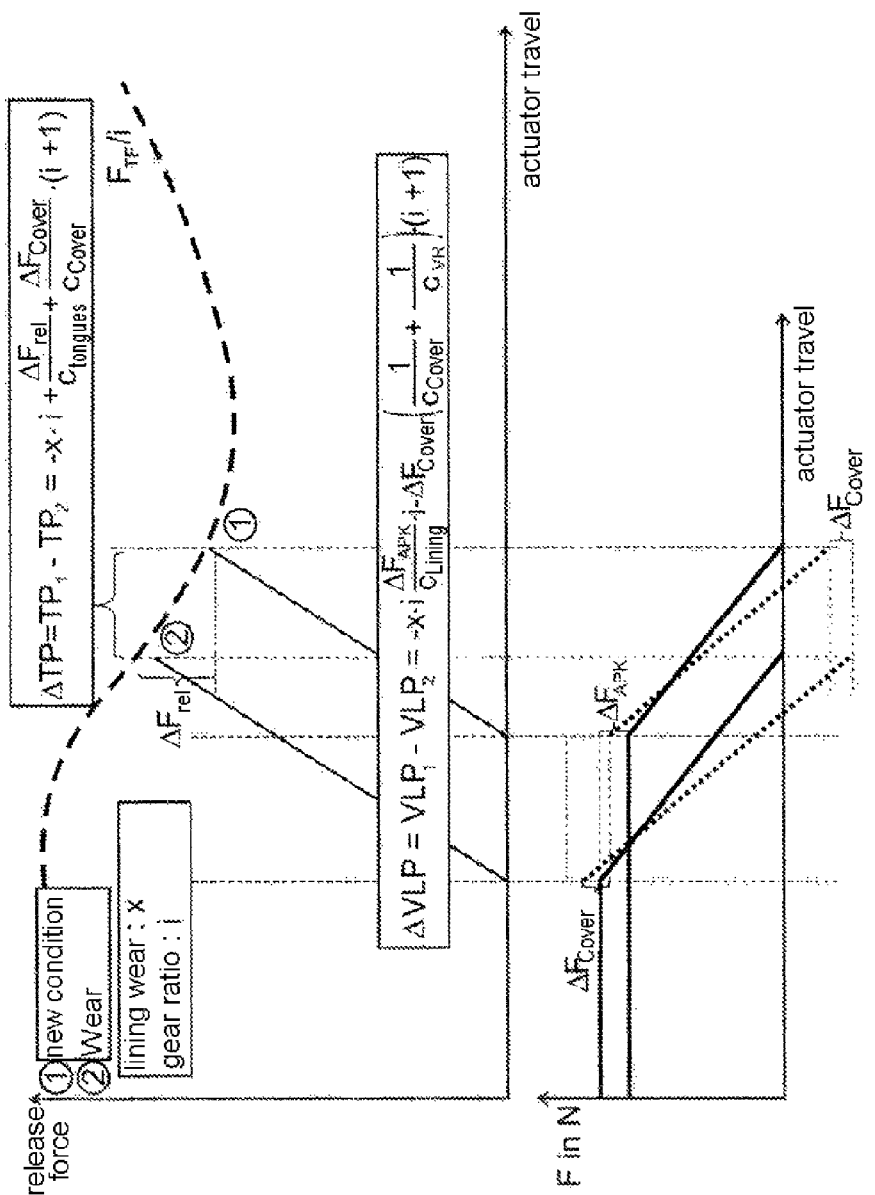
FIG. 6: shows an idealized representation of the release force of the actuator and the clutch characteristic curve for the calculation of a bite point and of a preload point of the clutch in the case of a working point shift.

Variation of preload point VLP and bite point TP following a shift of the working point BP:

Of further interest is the shift of the clutch characteristic curve due to influences such as lining wear or temperature change (FIG. 6). Due to a working point shift, the position of each point VLP, TP on the curve of the release force $F_{Rel}$ changes relative to the actuator axis $S_{Rel}$. The relative travel between the position before and after the working point shift can be quantified by means of a differential treatment.

In the event of a shift of the working point BP, the angular position of the disk spring 13 changes and results in a change of the disk spring 13 force. By means of the tongues of the disk spring 13, said change of position is transferred directly to the central disengagement device 11. In addition, the changed disk spring torque affects the pressing force of the separating clutch, the cover force and the release force $F_{Rel}$. Due to the changed forces, the relevant components are subjected to a changed elastic deformation, which affects the distance between the preload point VLP and the bite point TP.

$$\Delta s = s_1 - s_2 = -x \cdot i \cdot \Delta s_{Actuator,Tongue} - \Delta s_{Actuator,Lining} - \Delta s_{Actuator,Cover} - \Delta s_{Actuator,VR}$$

The equation shows that the influence of a working point shift affects every point of the release force characteristic curve. For the calculation of a defined point, such as for example the bite point TP or the preload point VLP, only the travel differences or the force differences before and after the working point shift at the point considered have to be known.

Calculation of the change of position of the preload point VLP following a working point shift:

As described above, every point on the release force characteristic curve is influenced by a working point shift of the separating clutch 4. The position of the preload point VLP thus changes in general:

$$\Delta VLP = VLP_1 - VLP_2 = -x \cdot i - \Delta s_{Actuator,Tongue} - \Delta s_{Actuator,Lining} - \Delta s_{Actuator,Cover} \Delta s_{Actuator,VR}$$

In contrast to an arbitrary point on the release force characteristic curve, some simplifications can be made at the preload point VLP. Due to the known preload on the disk spring tongues, which is held constant both before and after the working point shift, the compliance of the tongues does not change at the preload point VLP:

$$\Delta s_{Actuator,Tongue} = s_{Actuator,Tongue,1} - s_{Actuator,Tongue,2} = s_{Tongue,1} - s_{Tongue,2} = 0$$

However, due to the changed angular position of the disk spring 13, a greater pressing force is produced on the clutch linings, which results in a changed lining travel. Equally, the increased pressing force results in an increase of the cover force, which also increases the cover elasticity and the adjustment ring elasticity.

$$\Delta s_{Actuator,Lining} = s_{Actuator,Lining,1} - s_{Actuator,Lining,2} = i \cdot (s_{Lining,1} - s_{Lining,2}) \neq 0$$

$$\Delta s_{Actuator,Cover} = s_{Actuator,Cover,1} - s_{Actuator,Cover,2} = (i+1) \cdot (s_{Cover,1} - s_{Cover,2}) \neq 0$$

$$\Delta s_{Actuator,VR} = s_{Actuator,VR,1} - s_{Actuator,VR,2} = (i+1) \cdot (s_{VR,1} - s_{VR,2}) \neq 0$$

Overall, with a known lining wear the following change of position of the preload point VLP relative to the old position on the actuator axis $S_{Rel}$ results:

$$\Delta VLP = VLP_1 - VLP_2 = -x \cdot i - \Delta s_{Aactuator,Lining} - \Delta s_{Actuator,Cover} - \Delta s_{Actuator,VR}$$

$$\Delta VLP = -x \cdot i - \Delta s_{Lining} \cdot i - \Delta s_{Cover} \cdot (i+1) \Delta s_{VR} \cdot (i+1)$$

In the region of a small change of position, both the lining elasticity BF and the stiffness of the adjustment ring VR can be linearized. The cover stiffness is constant over the entire region.

$$c_{Lining} = \text{const.}$$

$$c_{VR} = \text{const.}$$

$$c_{Cover} = \text{const.}$$

The change of the preload point VLP therefore results exclusively from the working point shift and the increase of the pressing force and cover force of the separating clutch 4.

$$\Delta VLP = -x \cdot i - ((\Delta F_{APK})/c_{Lining}) \cdot i - ((\Delta F_{Cover})/c_{Cover}) \cdot (i+1) - ((\Delta F_{Cover})/c_{VR}) \cdot (i+1)$$

$$\Delta VLP = -i \cdot (x + \Delta F_{APK}/c_{Lining}) - (i+1) \cdot \Delta F\text{cover}(1/c_{Cover} + 1/c_{VR})$$

Calculation of the change of position of the bite point TP following a working point shift:

Also in the region of the bite point TP the shift of the working point BP does not affect all relevant components. Because the clutch torque $M_{Clutch}$ is held constant at the bite point TP, the pressing force remains constant at the bite point TP. Therefore, the lining elasticity BF has no effect on the changed position of the bite point TP.

$$\Delta s_{Actuator,Lining} = s_{Actuator,Lining,1} - s_{Actuator,Lining,2} = i \cdot (s_{Lining,1} - s_{Lining,2}) = 0$$

At the bite point TP, the cover 12 is loaded with a negative force (strain). Due to the specific installation position of the adjustment ring VL, the same can only be loaded with compression forces and also continues to not be taken into account at the bite point TP.

$$\Delta s_{Actuator,VR} = s_{Actuator,VR,1} - s_{Actuator,VR,2} = (i+1) \cdot (s_{VR,1} - s_{VR,2}) = 0$$

$$\Delta s_{Actuator,Tongue} = s_{Actuator,Tongue,1} - s_{Actuator,Tongue,2} = s_{Tongue,1} - s_{Tongue,2} \neq 0$$

$$\Delta s_{Actuator,Cover} = s_{Actuator,Cover,1} - s_{Actuator,Cover,2} = (i+1) \cdot (s_{Cover,1} - s_{Cover,2}) \neq 0$$

Therefore, the change of position of the bite point TP results from the working point shift and the effect thereof on the remaining components, the disk spring tongues and the cover 12.

$$\Delta TP = TP_1 - TP_2 = -x \cdot i - \Delta s_{Actuator,Tongues} \Delta s_{Actuator,Cover}$$

$$\Delta TP = -x \cdot i - \Delta s_{Tongues} \Delta s_{Cover} \cdot (i+1)$$

The stiffness of the two relevant components is constant over the entire operating region:

$$c_{Tongues} = \text{const.}$$

$$c_{Cover} = \text{const.}$$

The following relationship relative to a bite point shift thus results:

$$\Delta TP = -x \cdot i (\Delta F_{Rel}/c_{Tongues}) - (\Delta F_{Cover}/c_{Cover}) \cdot (i+1)$$

Due to the introduction of the relationship between the preload point VLP and the bite point TP, with knowledge of the stiffnesses of the components and the force conditions within the separating clutch 4, increased prediction accuracy relative to the position of the clutch characteristic curve can be achieved.

In principle, with the computer model the following possibilities arise:
  calculation of the bite point TP with knowledge of the preload point VLP
  calculation of the preload point VLP with knowledge of the bite point TP
  verification of the model (re-parameterization) with knowledge of the preload point and the bite point The calculation of the respective other characteristic point TP, VLP using a newly adapted point requires the following variables:
  clutch gear ratio i
  pressing force at the bite point TP or preload point VLP and the newly adapted point, characteristic curve of the lining elasticity BF
  release force at the bite point TP or the preload point VLP and the newly adapted point, characteristic curve of the tongue elasticity
  cover force at the bite point TP or the preload point VLP and the newly adapted point, characteristic curve of the cover elasticity
  adjustment ring force at the bite point TP or the preload point VLP and the newly adapted point, characteristic curve of the adjustment ring elasticity If there is no working point shift, then all the aforementioned variables can be assumed to be constant. The result thereof is that the position of the bite point TP and the preload point VLP relative to reach other is constant and a change of the separation between the two points results exclusively from working point shifts.

Because the clutch linings are worn by frictional energy with the separating clutch 4 in the form of a dry friction clutch, at least said influence must be incorporated in the computer model. The influence of a working point shift on the separation of the preload point VLP and the bite point TP can be taken into account by integration of a rate of wear. Furthermore, the computer model offers the further options:

calculation of the change of the bite point TP with knowledge of the working point shift calculation of the change of the preload point VLP with knowledge of the working point shift calculation of a working point shift by considering the difference of two successive adaptations detection of a wear adjustment in the clutch system Due to the working point shift, the force of the disk spring 13 changes, which results in a change of all forces and sometimes also stiffnesses. The characteristic curve of the lining elasticity BF and the characteristic curve of the adjustment ring elasticity comprise a marked nonlinearity and must be linearized in the relevant regions for the computer model. The stiffnesses of the cover 12 and the disk spring tongues are constant over the entire operating region and can be incorporated into the computer model without change.

An estimate of the change of the individual forces could be carried out using stored characteristic curves.

Thus, in comparison with previous methods without a working point shift, it is now possible to calculate a theoretical working point shift by summation of the frictional energies. On the basis of said calculation, the change of position of the bite point TP and the preload point VLP can be actively determined even without adaptation. Said strategy presents itself above all if adaptations are not possible over a long period.

Detection of a working point shift:

A working point shift is mainly produced by lining wear on the friction linings of the separating clutch 4. Further influencing variables, such as for example through temperature-related thermal expansion, are conceivable with different coefficients of thermal expansion.

A temperature sensor can give an indication for the quantification of a temperature-related working point shift. For this purpose, there must be a computer model or a characteristic field that determines the working point shift using the measured temperature.

Due to the incorporation of an energy model, the lining wear of the friction lining can be estimated and used as an input variable for the computer model. For this purpose, the friction loss of the separating clutch 4 is integrated against time for determining the frictional energy:

$$E_{Friction} = \int_0^t P_{Friction} \cdot dt = \int_0^t M_{Clutch} \cdot (\omega_{Electric\ motor} - \omega_{VKM}) \cdot dt$$

With the aid of the rate of wear (VR) and the (single-sided) area of the friction lining ($A_{Lining}$) the axial decrease of the disk thickness can be calculated:

$$x = E_{Friction} \cdot VR \cdot (1/A_{Lining})$$

Due to the incorporation of an energy model (accumulated integration of friction loss in the separating clutch), the computer model can be expanded and a change of position of the bite point TP and/or the preload point VLP can be determined with knowledge of an initial value.

It is thus possible to increase the accuracy of the knowledge of the clutch characteristic curve even without adaptation of the bite point TP or of the preload point VLP. If the working point BP is significantly influenced by the temperature of the separating clutch 4, then a positional adaptation could be carried out by the computer model while taking into account the temperature influence, even in the event of a long-term lack of knowledge of the preload point VP and the bite point TP (for example motorway travel).

In vehicles with a hybrid drivetrain, the accuracy of the knowledge about the torque of the starting clutch has a significant influence on the quality and comfort of an internal combustion engine start. For increased accuracy, a computer model has been introduced that combines the preload point of the clutch with the bite point on the clutch characteristic curve and hence reduces the number of adaptations for detecting the position of the clutch characteristic curve.

REFERENCE CHARACTER LIST

1 drivetrain
2 internal combustion engine
3 electric motor
4 separating clutch
5 crankshaft
6 rotor
7 stator
8 output shaft
9 gearbox
10 drive wheels
11 electric central disengagement device
12 clutch cover
13 disk spring
14 release bearing
15 flange shaft
16 clutch disk
17 pressure plate
18 counter plate
VP adjustment ring
DMF dual mass flywheel

The invention claimed is:

1. A method for determining a characteristic curve of a clutch activation system in a drivetrain, comprising:
    activating the clutch with an actuator,
    adapting a bite point (TP) of the clutch as a first support point of the characteristic curve,
    using a preload point (VLP) of the actuator as a second support point of the characteristic curve,
    calculating the preload point (VLP) based on the adapted bite point (TP) or adapting the preload point (VLP) before the activation of the drivetrain and calculating the bite point (TP) based on the adapted preload point (VLP), and
    using the clutch as a separating clutch in a hybrid drivetrain, the separating clutch being disposed between an internal combustion engine and an electric motor, and with the separating clutch engaged carrying out a torque transfer from the electric motor to the internal combustion engine to start the internal combustion engine when the internal combustion engine is in a static condition.

2. The method as claimed in claim 1, further comprising checking whether there is a working point shift of the characteristic curve of the clutch and the bite point (TP) and calculating the preload point (\LP) depending on the working point shift of the characteristic curve of the clutch.

3. The method as claimed in claim 2, wherein in the case of an unchanged working point (BP) of the clutch, the method further comprises adding a constant to the adapted bite point (TP) or the adapted preload point (VLP), from which the calculated preload point (VLP) or the calculated bite point (TP) results.

4. The method as claimed in claim 3, wherein the calculation of the preload point (VLP) or of the bite point (TP) is carried out depending on a clutch gear ratio (i) or a pressing force of the clutch at the preload point (VLP) and the bite point (TP) or a cover elasticity of the clutch cover at the preload point (VLP) and the bite point (TP) or an adjustment ring force at the preload point (VLP) and the bite point (TP), or a combination thereof.

5. The method as claimed in claim 2, further comprising upon detection of a working point shift, determining a rate of wear (VR) of the clutch, which is integrated to a distance from the bite point (TP) and the preload point (VLP), whereby a rate of wear dependent parameter is obtained and calculating the bite point (TP) from the bite point (TP) without a working point shift by the rate of wear-dependent parameter or the preload point (VLP) is calculated from the preload point (VP) without a working point shift by the rate of wear dependent parameter, or a combination thereof.

6. The method as claimed in claim 5, wherein the working point shift occurs as a result of lining wear of the dry clutch or as a result of temperature differences in the clutch, or both.

7. The method as claimed in claim 2, wherein a calculation of the working point shift is carried out by a difference treatment of two successive adaptations of the bite point (TP) or of the preload point (\ LP).

8. The method as claimed in claim 2, further comprising detecting a wear adjustment of the clutch from the working point shift.

9. The method of claim 7, wherein a wear condition of friction lining of the separating clutch is determined.

10. The method of claim 9, wherein a wear condition value is used as an input variable for determining the preload point.

11. The method of claim 8, wherein the wear adjustment includes adjustment of a disk spring to maintain a working point.

12. The method of claim 2, wherein the working point shift is calculated by a summation of frictional energies of the separating clutch.

* * * * *